April 2, 1929.  S. S. BIXEL  1,707,384

HARROW

Filed March 27, 1928

Inventor:
S. S. Bixel
By Monroe E. Miller
Attorney.

Patented Apr. 2, 1929.

1,707,384

UNITED STATES PATENT OFFICE.

SAMUEL S. BIXEL, OF BLUFFTON, OHIO.

HARROW.

Application filed March 27, 1928. Serial No. 265,198.

The present invention relates to harrows and clod crushers, and aims to provide a novel and improved device for crushing or breaking up the clods or lumps of dirt when plowing.

The invention embodies an attachment for the wheel of a tractor used for pulling a plow or plows, and adapted to work on the surface of the plowed ground, in order to break up the lumps of dirt during the plowing operation.

A further object of the invention is to provide a device of the character indicated which will pulverize and level the plowed ground while it is damp, and before it becomes hardened by the sun and wind, which will keep or provide a mulch at the surface of the ground in order to retain the moisture essential to plant growth, which will enable the tractor to move on solid ground while harrowing, and which will save power and wear and tear on the tractor.

Another object of the invention is the provision of a novel attachment for a tractor wheel for the purpose indicated.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1:
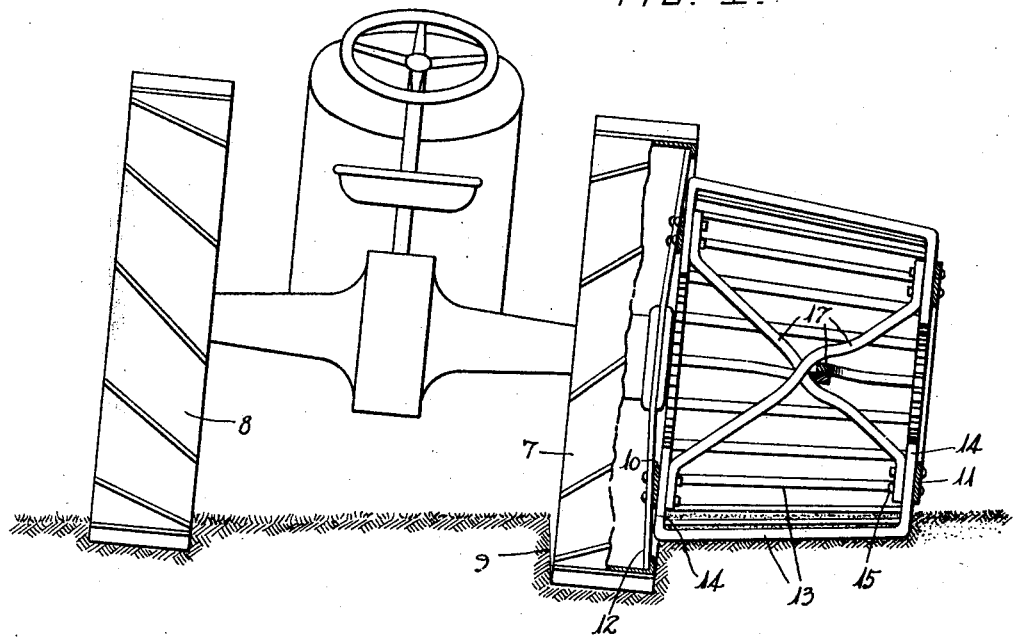
Figure 1 is a rear view of a tractor having the attachment applied, the attachment and a portion of the tractor wheel to which it is applied being shown in section.
Figure 2:
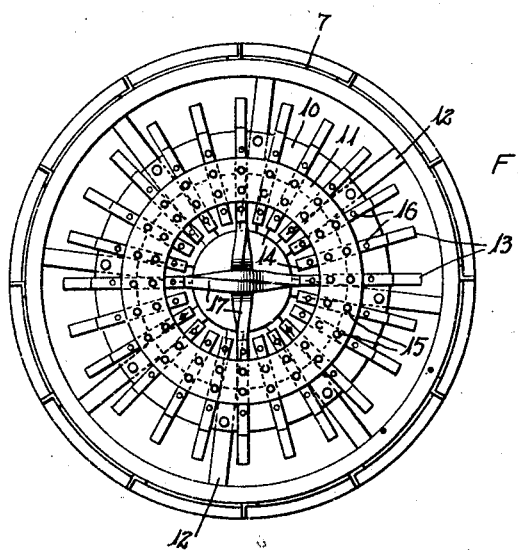
Fig. 2 is a side elevation of the attachment on the tractor wheel.

The device may be constructed to be applied to any suitable tractor used for pulling a plow or plows. The tractor shown in Fig. 1 has the right and left rear tractor wheels 7 and 8, respectively, and the right hand wheel moves in the last furrow 9 made by the plows of a gang pulled by the tractor.

The harrow attachment is of simple construction, and has the inner and outer flat rings 10 and 11, the inner ring 10 being secured in any suitable manner to the spokes 12 of the wheel 7, so that the attachment is carried by and rotates directly with the wheel which works in the furrow. Bars 13 are disposed in annular arrangement, and have inwardly extending radial terminal portions 14 extending across the rings 11 and fastened to said rings by means of bolts 15 or other suitable securing elements. The terminals 14 have a series of apertures 16 to receive said bolts, in order that the bars may be adjusted to different diameters, so as to properly engage the ground.

Crossed diagonal braces 17 are provided between the rings 10 and 11, in order to brace the structure, and the terminals of the braces may be held by the corresponding bolts 15.

The attachment is of tapered or frusto-conical form in order that the bars 13 will contact with the soil substantially parallel with the surface thereof, the tractor being tilted owing to the fact that the wheel 8 moves on the surface of the ground while the wheel 7 travels in the furrow 9. The bars 13 will break up the lumps or clods of dirt, thereby harrowing or pulverizing the soil simultaneously with the plowing operation. The attachment is preferably of a length to correspond with the number of plows pulled by the tractor, in order that the attachment will operate over a strip of ground equal to the width of the strip turned by the plows.

Having thus described the invention, what is claimed as new is:—

1. A harrow attachment for a tractor wheel comprising inner and outer rings, bars connected to said rings for radial adjustment and to engage the soil, diagonal braces connected to said rings, and means for attaching one of said rings to the wheel of a tractor.

2. A harrow attachment for a tractor wheel comprising inner and outer rings, and annular set of bars having inwardly extending radial terminals adjustably attached to said rings, and means for attaching one of said rings to a tractor wheel.

3. A harrow attachment for a tractor wheel comprising inner and outer rings, an annular set of bars having inwardly extending radial terminals adjustably attached to said rings, diagonal braces between said rings, and means for attaching one of said rings to the wheel of a tractor.

4. A tractor wheel attachment comprising inner and outer rings, an annular set of bars of frusto-conical form having inwardly extending radial terminal portions extending across and adjustably secured to said rings.

In testimony whereof I hereunto affix my signature.

SAMUEL S. BIXEL.